(12) United States Patent
Yamada (10) Patent No.: US 11,535,391 B2
(45) Date of Patent: Dec. 27, 2022

(54) COOLING DUCT (71) Applicant: SUBARU CORPORATION, Tokyo (JP)

(72) Inventor: Kai Yamada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 359 days.

(21) Appl. No.: 16/837,256

(22) Filed: Apr. 1, 2020

(65) Prior Publication Data

US 2020/0354072 A1 Nov. 12, 2020

(30) Foreign Application Priority Data

May 7, 2019 (JP) .............................. JP2019-087896

(51) Int. Cl.
*B64D 33/10* (2006.01)
*B64C 27/06* (2006.01)
*B64C 21/02* (2006.01)
*B64C 23/00* (2006.01)

(52) U.S. Cl.
CPC .............. *B64D 33/10* (2013.01); *B64C 21/02* (2013.01); *B64C 23/00* (2013.01); *B64C 27/06* (2013.01)

(58) Field of Classification Search
CPC ......... B64C 21/02; B64C 23/00; B64D 33/10; B64D 33/08; F01P 7/02
See application file for complete search history.

(56) References Cited

U.S. PATENT DOCUMENTS

| 2,381,705 | A | * | 8/1945 | Cecil | .......................... F02C 7/05 |
| | | | | | 55/306 |
| 4,502,875 | A | * | 3/1985 | Ballard | ................... F02C 7/052 |
| | | | | | 55/306 |
| 2010/0181416 | A1 | * | 7/2010 | Sakamoto | ............. B64C 39/024 |
| | | | | | 244/17.21 |

(Continued)

FOREIGN PATENT DOCUMENTS

EP  2 987 986 A1  2/2016
FR  3 048 233 A1  9/2017

(Continued)

OTHER PUBLICATIONS

Extended European Search Report dated Oct. 16, 2020 for European Patent Application No. 20168209.3-1010.

*Primary Examiner* — Tye William Abell
(74) *Attorney, Agent, or Firm* — McGinn I.P. Law Group, PLLC.

(57) ABSTRACT

A cooling duct configured to introduce air flow to a cooling target device provided in a helicopter body of a helicopter includes a duct body, a front opening, an upper opening, a hinge, and a movable blade. The duct body is mountable below a main rotor of the helicopter to be adjacent to the cooling target device. The front opening is formed on a forward side of the helicopter body in the duct body. The upper opening is formed on an upper side of the helicopter body in the duct body. The hinge is disposed in an upper portion of the duct body and includes a pivot shaft extending in a lateral direction of the helicopter body. The movable blade with an end that is pivotally supported by the hinge is provided to be pivotable about the pivot shaft between a first position and a second position.

19 Claims, 8 Drawing Sheets

(56) References Cited

U.S. PATENT DOCUMENTS

| | | | |
|---|---|---|---|
| 2010/0230530 A1* | 9/2010 | Nannoni | B64D 33/02 244/17.11 |
| 2015/0183521 A1* | 7/2015 | Ohnishi | B64D 33/10 244/17.11 |
| 2019/0127072 A1 | 5/2019 | Van Keuren et al. | |

FOREIGN PATENT DOCUMENTS

| | | |
|---|---|---|
| JP | 2002-193193 A | 7/2002 |
| JP | 2014-019357 A | 2/2014 |

* cited by examiner

COOLING DUCT

CROSS-REFERENCE TO RELATED APPLICATIONS

The present application claims priority from Japanese Patent Application No. 2019-087896 filed on May 7, 2019, the entire contents of which are hereby incorporated by reference.

BACKGROUND

The disclosure relates to a cooling duct that air-cools a target device to be cooled, which is hereinafter referred to as a cooling target device, such as a radiator provided on a helicopter.

To date, techniques to enhance an engine cooling effect by efficiently introducing outside air to a radiator in various flight states of a helicopter have been reviewed. For example, Japanese Unexamined Patent Application Publication (JP-A) No. 2014-19357 discloses that a plurality of openings are provided in a body cover of a helicopter in addition to the opening in which a radiator is provided, and accordingly, in states of hovering, advance, and recession, outside air is caused to flow into the body cover while flowing outside the body cover through the plurality of openings.

JP-A No. 2002-193193 discloses that a first radiator is provided in an opening provided on the upper side of a forward portion of the helicopter body and a second radiator with a wind receiving surface that is approximately vertical is provided on the lower side of the forward portion of the helicopter body, and accordingly, an engine is effectively cooled in various flight states.

SUMMARY

An aspect of the disclosure provides a cooling duct configured to introduce air flow to a cooling target device provided in a helicopter body of a helicopter. The cooling duct includes a duct body, a front opening, an upper opening, a hinge, and a movable blade. The duct body is mountable below a main rotor of the helicopter so as to be adjacent to the cooling target device. The front opening is formed on a forward side of the helicopter body in the duct body. The upper opening is formed on an upper side of the helicopter body in the duct body. The hinge is disposed in an upper portion of the duct body and includes a pivot shaft extending in a lateral direction of the helicopter body. The movable blade with an end that is pivotally supported by the hinge is provided so as to be pivotable about the pivot shaft between a first position where the front opening is closable and a second position where the upper opening is closable.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

As for a helicopter whose flight state varies, it has been difficult to decide where to place an engine cooling radiator. For example, the placement position decided through optimization based on the assumption of the air flow in a hovering state and the placement position decided through optimization based on the assumption of the air flow in an advancing state have been traded off against each other.

In this regard, even if a large number of openings are provided in the body cover as described in JP-A No. 2014-19357, the number of openings that mainly introduce air to a radiator has been one and it has been impossible to efficiently introduce air to the radiator through the opening according to variation in flight state. If a plurality of radiators are provided as described in JP-A No. 2002-193193, the unit configuration of the helicopter is complicated and the number of components and the weight are increased.

Another method is also conceivable, in which outside air is efficiently introduced to a radiator both in a hovering state and in an advancing state by providing an air-cooling mechanism with a movable blade using an actuator. Even by this method, however, additional devices such as an actuator and a controller therefor, a sensor, and the like are desired and accordingly, the unit configuration of the helicopter is complicated and the number of components and the weight are increased.

Thus, it is desirable to efficiently introduce air flow to be used for a cooling target component, such as a radiator, according to the flight state of a helicopter by employing an air-cooling mechanism with no actuator.

Some embodiments of the disclosure are described in detail below with reference to the accompanying drawings. The dimensions, materials, other specific values, and the like mentioned in the embodiments are mere examples for facilitating understanding of the disclosure and are not intended to limit the disclosure unless otherwise specified. In the present specification and drawings, elements having substantially the same functions and structures are given the same reference signs and overlapping descriptions thereon are omitted. In addition, illustrations of the elements that are not directly relevant to the disclosure are omitted.

1. Overall Structure of Helicopter

Figure 1:
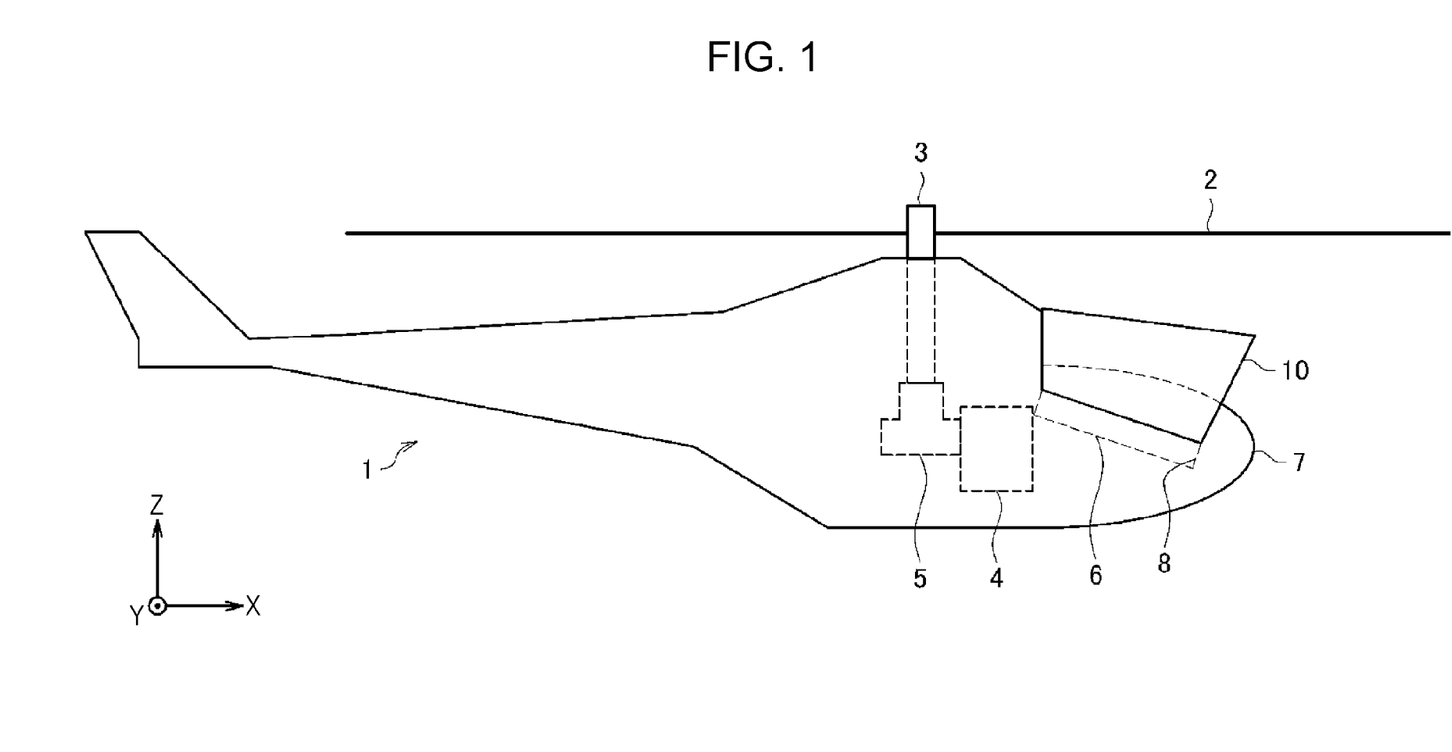
FIG. 1 is a side view illustrating a helicopter related to a first embodiment of the disclosure.

First, a schematic structure of a helicopter 1 related to a first embodiment of the disclosure is described. FIG. 1 is a side view illustrating the helicopter 1 related to the present embodiment.

As illustrated in FIG. 1, the helicopter 1 related to the present embodiment includes a main rotor 2, a rotor shaft 3, an engine 4, a transmission 5, a radiator 6, a body cover 7 that covers various devices including the engine 4 and the transmission 5, and a cooling duct 10 that introduces air flow to the radiator 6. Inside the body of the helicopter 1, a controller that controls various devices mounted on the helicopter 1, a detector, a fuel tank, and the like are further disposed, which are not illustrated.

The main rotor 2 is a rotor blade that obtains lift of the helicopter 1 and propulsion in a traveling direction. The main rotor 2 is attached to the rotor shaft 3 extending in a direction that is perpendicular to a longitudinal direction X and a lateral direction Y of the body of the helicopter 1, which is an upright direction Z of the body of the helicopter 1. The lift of the helicopter 1 and its propulsion in the traveling direction are varied by varying a plane (a rotation circular plane) that the main rotor 2 draws by rotating the main rotor 2 with the engine 4. Accordingly, the helicopter 1 can fly in various flight states (for example, ascending, descending, hovering, advance, recession, slewing, and the like).

The engine 4 is disposed below the main rotor 2 and further forward than the rotor shaft 3, and generates driving force for rotation driving of the main rotor 2. The transmission 5 is coupled to the rotor shaft 3 and the engine 4, and transmits the driving force of the engine 4 to the main rotor 2 through the rotor shaft 3.

The radiator 6 is provided further on the forward side of the helicopter body than the engine 4 and below the main rotor 2. In the illustrated example, the radiator 6 is provided further on the obliquely forward and upward side than the engine 4. The radiator 6 has a shape that is approximately rectangular in a plan view for example, and is disposed so that its upper face faces obliquely forward and upward. The radiator 6 includes a plurality of vents (not illustrated) pierced in its thickness direction so that the air flow introduced from the upper side can pass through the inside of the radiator 6.

The radiator 6 is disposed on the forward side of the body of the helicopter 1 and below the main rotor 2. The radiator 6 is provided in an opening 8, which is formed on the upper side of the body cover 7 and positioned on the forward side of the helicopter body, and is exposed to outside air. The radiator 6 is coupled to the engine 4 with interposition of a coupling member (not illustrated) and cooling water of the engine 4 circulates in the radiator 6. The radiator 6 releases the heat of the engine 4 using the cooling water as a coolant and the engine 4 is water-cooled.

The cooling duct 10 is provided over and adjacent to the radiator 6. The cooling duct 10 is a constituent of an air-cooling mechanism used to introduce air flow to a cooling target device (e.g. the radiator 6) provided on the forward side of the body of the helicopter 1. The cooling duct 10 communicates with the opening 8 of the body cover 7 and sends air into the radiator 6 disposed in the opening 8. The cooling duct 10 serves as an air intake duct that introduces outside air to a cooling target device, such as the radiator 6, during a flight of the helicopter 1. In addition to the above-described opening 8, the body cover 7 includes a plurality of vent holes (not illustrated), which include the vent holes provided on the lower side of the radiator 6.

In the helicopter 1, outside air can be caused to flow into the body cover 7 through the cooling duct 10 and the opening 8 described above and air in the body cover 7 can be caused to flow outside through the vent holes described above. Thus, rise in the temperature of the air inside the body cover 7 can be suppressed and rise in the respective temperatures of various devices mounted on the helicopter 1 (for example, the radiator 6, the engine 4, the controller, and the like) can be suppressed.

When the helicopter 1 related to the present embodiment is an unmanned helicopter, there is no necessity to provide a cockpit like one in a manned helicopter. Thus, space can be ensured on the forward side of the body of the helicopter 1 (on the forward and upper side of the body cover 7), in which a cooling target component, such as the radiator 6, and an air-cooling mechanism, such as the cooling duct 10, can be placed. Further, it is advantageous in that the placement positions and sizes of the cooling target component and the air-cooling mechanism that are placed on the forward side of the helicopter body are larger in degree of flexibility than those in a manned helicopter.

In the present embodiment, an example in which a cooling target device of the air-cooling mechanism including the cooling duct 10 is the radiator 6 is described. The cooling target device is, however, not limited to the example of the radiator 6 but may be any device as long as the device is mounted on the helicopter and desires air cooling, which is, for example, an oil cooler capable of cooling an engine oil, or various controllers.

2. Structure of Cooling Duct

Figure 2:
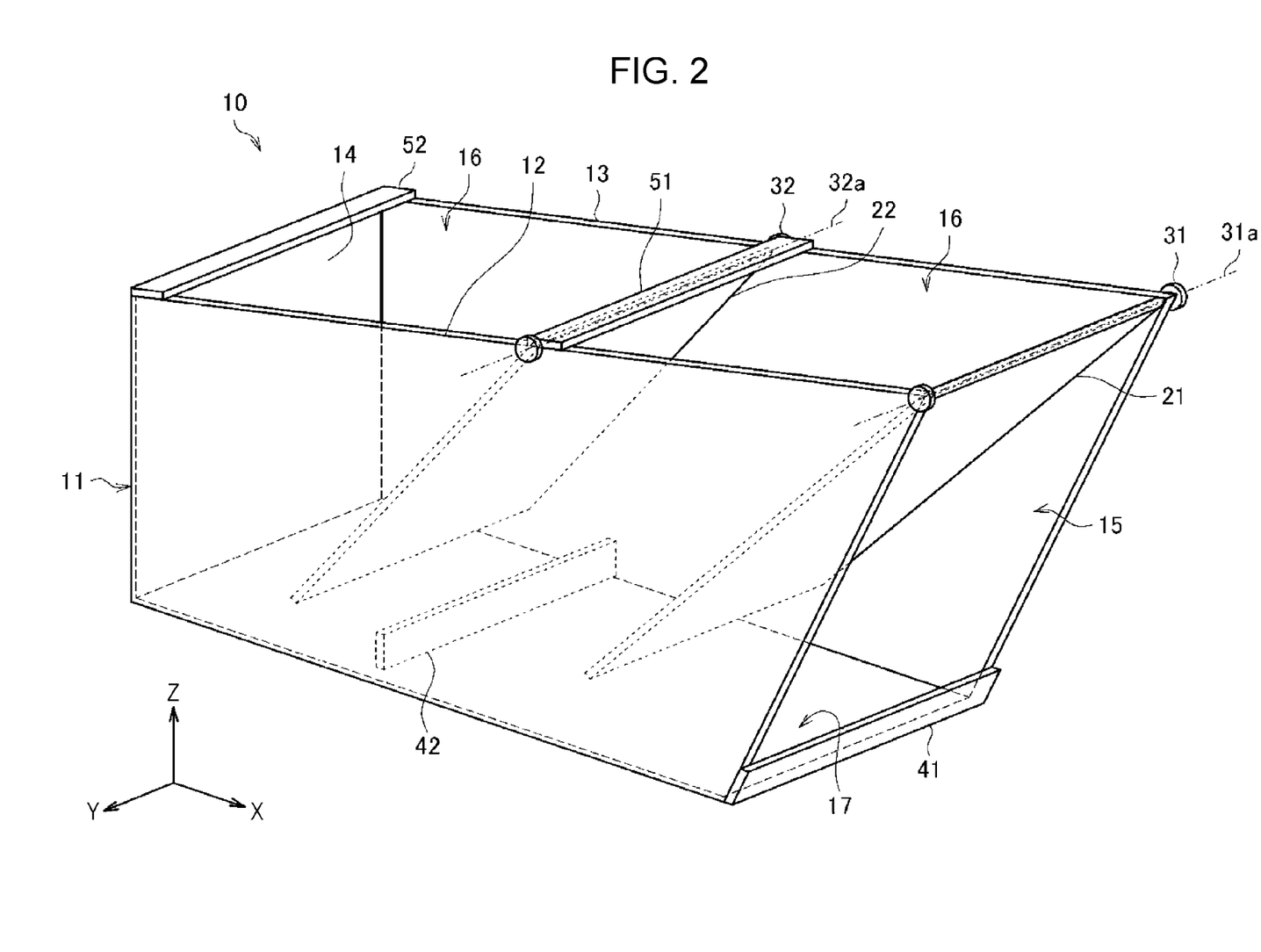
FIG. 2 is a perspective view illustrating a cooling duct according to the embodiment.
Figure 3:
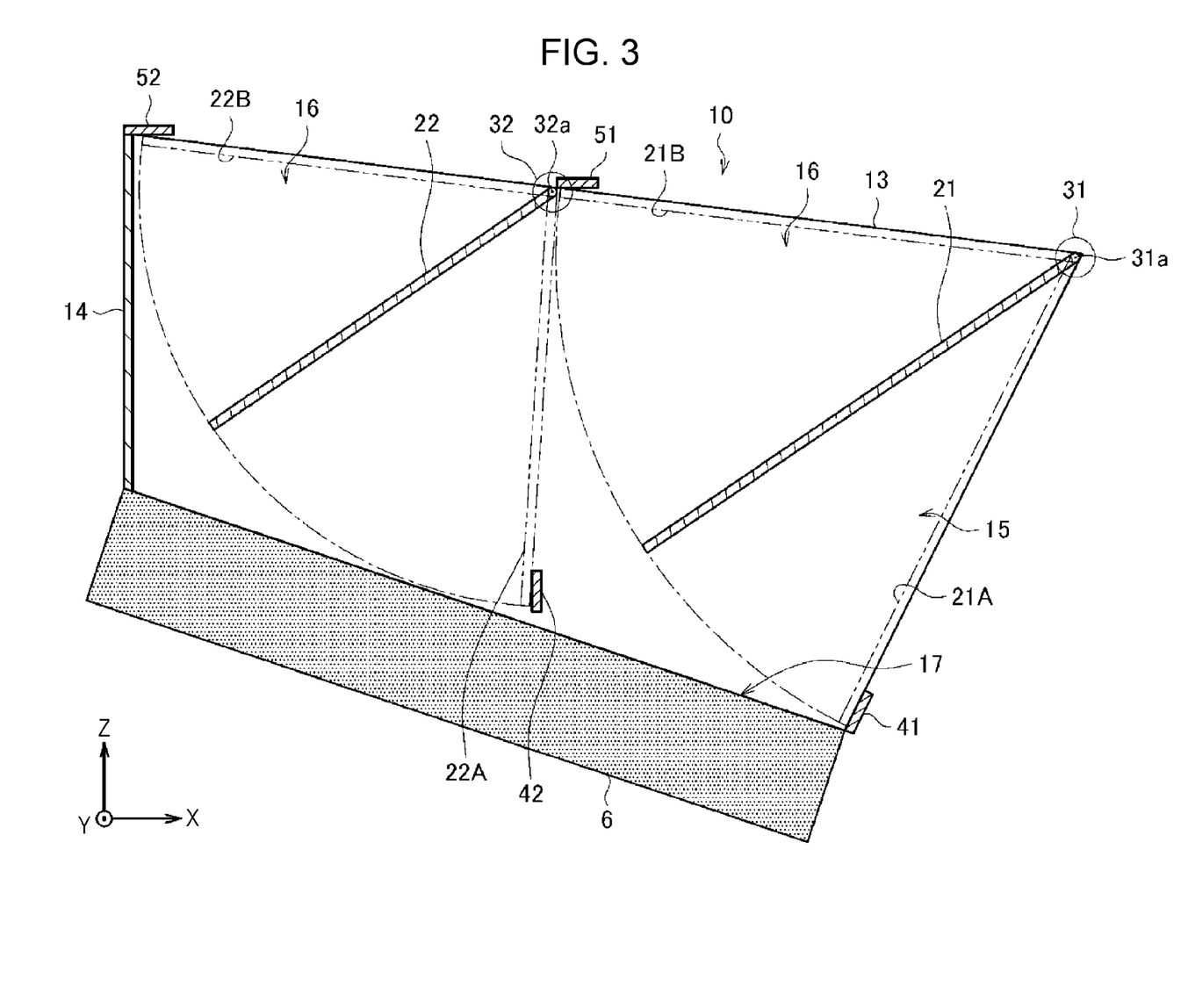
FIG. 3 is a longitudinal cross-sectional view illustrating a cross section of the cooling duct according to the embodiment, which is cut along a longitudinal direction of the helicopter body.

Next, a structure of the cooling duct 10 of the helicopter 1 related to the present embodiment is described in detail with reference to FIGS. 2 and 3. FIG. 2 is a perspective view illustrating the cooling duct 10 according to the present embodiment. FIG. 3 is a longitudinal cross-sectional view illustrating a cross section of the cooling duct 10 according to the present embodiment, which is cut along the longitudinal direction X of the helicopter body. Hereinafter, the longitudinal direction X of the helicopter body, the lateral direction Y of the helicopter body, and the upright direction Z of the helicopter body may be abbreviated as the longitudinal direction X, the lateral direction Y, and the upright direction Z, respectively, while the forward side of the helicopter body, the rearward side of the helicopter body, the upper side of the helicopter body, and the lower side of the helicopter body may be abbreviated as the forward side, the rearward side, the upper side, and the lower side, respectively.

As illustrated in FIGS. 2 and 3, the cooling duct 10 includes a duct body 11 (a right side wall 12, a left side wall 13, and a rear face wall 14), which extends in the longitudinal direction X, movable blades (a forward movable blade 21 and a rearward movable blade 22), hinges (a forward hinge 31 and a rearward hinge 32), and stoppers (forward stoppers 41 and 42, and upper stoppers 51 and 52).

The duct body 11 is an angular and tubular duct of an approximately rectangular parallelepiped shape including the right side wall 12, the left side wall 13, and the rear face wall 14. The front face, upper face, and lower face of the duct body 11 constitute openings (i.e. a front opening 15, an upper opening 16, and a lower opening 17, respectively) instead of having walls.

The right side wall 12 and the left side wall 13 are, for example, tabular members that each have an approximately trapezoidal or rectangular shape extending in the longitudinal direction X of the helicopter body. The right side wall 12 and the left side wall 13 are disposed so as to be parallel to each other and be both perpendicular to the lateral direction Y. However, the disposition is not limited to this example. It is not necessarily desired for the right side wall 12 and the left side wall 13 to be parallel to each other and perpendicular to the lateral direction Y but the disposition may be changed as suitable as long as outside air can be introduced to the radiator 6. For example, the right side wall 12 and the left side wall 13 may be obliquely disposed so that the distance therebetween becomes larger toward the upper ends.

The rear face wall 14 is, for example, a tabular member of an approximately rectangular shape, which extends in the lateral direction Y. The rear face wall 14 is disposed so as to be perpendicular to the longitudinal direction X or may be disposed so as to be oblique to the longitudinal direction X. The rear face wall 14 is coupled to the right side wall 12 and the left side wall 13 airtightly. Although being made of, for example, metallic tabular members in the present embodiment, the right side wall 12, the left side wall 13, and the rear face wall 14 are not limited to this example but may each employ another material, such as a curved plate.

As described above, the duct body 11 is a shield against air, where three faces, i.e. the right side face, the left side face, and the rear side face, are surrounded by the right side wall 12, the left side wall 13, and the rear face wall 14 as shield plates. The front face, upper face, and lower face of the duct body 11 are provided with the front opening 15, the upper opening 16, and the lower opening 17, respectively. The front opening 15, the upper opening 16, and the lower opening 17 are positioned on the forward side, upper side, and lower side of the helicopter body in the duct body 11, respectively, which are, for example, approximately rectangular openings. Although the upper face, front face, and lower face of the duct body 11 are all or partially opened in the present embodiment, the respective areas of the openings of the faces may be set so as to be smaller than the illustrated examples.

As described above, both the right and left side faces and the rear face of the duct body 11 are provided with the right side wall 12, the left side wall 13, and the rear face wall 14 as shield plates, respectively, while the front face, upper face, and lower face of the duct body 11 are provided with the front opening 15, the upper opening 16, and the lower opening 17, respectively, instead of walls. During a flight of the helicopter 1, the front opening 15 and the upper opening 16 serve as air intake ports used to take outside air into the duct body 11 from the forward and upper sides of the duct body 11 while the lower opening 17 serves as a discharge port used to discharge the air in the duct body 11 to the radiator 6 present below.

In the helicopter body, the duct body 11 is disposed below the main rotor 2 of the helicopter 1 and over the radiator 6 so as to be adjacent to the radiator 6. Internal space of the duct body 11 communicates with the vents in the radiator 6. This structure enables it to, during a flight of the helicopter 1, air flow is led from one or both of the forward side and upper side of the duct body 11 while air flow can be guided to the radiator 6 disposed below the duct body 11.

Next, a louver mechanism provided in the cooling duct 10 is described. As illustrated in FIGS. 2 and 3, the cooling duct 10 includes the forward movable blade 21, the rearward movable blade 22, the forward hinge 31, the rearward hinge 32, the forward stoppers 41 and 42, and the upper stoppers 51 and 52.

In the internal space of the duct body 11 of the cooling duct 10 according to the present embodiment, two movable blades (the forward movable blade 21 and the rearward movable blade 22) are provided in parallel in the longitudinal direction X. The forward movable blade 21 and the rearward movable blade 22 are, for example, approximately rectangular metallic flat plates. The flat areas of the forward movable blade 21 and the rearward movable blade 22 are approximately the same as or slightly smaller than the areas of the front opening 15 and the rear face wall 14 of the cooling duct 10. Each movable blade may be formed of a material different from metal or be a curved plate, or may have a shape different from a rectangle. It is desirable that each movable blade be light and thin so as to be enabled to swing easily by the pressing force of air flow.

Two hinges, i.e. the forward hinge 31 and the rearward hinge 32, are provided so as to correspond to the above-described two movable blades, i.e. the forward movable blade 21 and the rearward movable blade 22. The forward hinge 31 and the rearward hinge 32 are disposed in an upper portion of the duct body 11 and have pivot shafts (hinge axes) 31a and 32a, which extend in the lateral direction Y. In the illustrated example, in the upper portion of the duct body 11, the forward hinge 31 and the rearward hinge 32 are disposed so as to couple an upper end of the right side wall 12 and an upper end of the left side wall 13 in the lateral direction Y. In the illustrated example, in the upper portion of the duct body 11, the forward hinge 31 and the rearward hinge 32 are disposed so as to couple an upper end of the right side wall 12 and an upper end of the left side wall 13 in the lateral direction Y.

In the upper portion of the duct body 11, the forward hinge 31 is disposed on the forward side of the helicopter body and, in the illustrated example, is disposed near forward ends of the right side wall 12 and the left side wall 13 in the longitudinal direction X. In the upper portion of the duct body 11, the rearward hinge 32 is disposed further on the rearward side of the helicopter body than the forward hinge 31 and, in the illustrated example, is disposed near central portions of the right side wall 12 and the left side wall 13 in the longitudinal direction X.

The forward movable blade 21 and the rearward movable blade 22 are pivotally supported so as to be enabled to pivot by the forward hinge 31 and the rearward hinge 32, respectively. An end (e.g. an upper end) of the forward movable blade 21 is pivotally supported by the forward hinge 31 while the other end (e.g. a lower end) of the forward movable blade 21 remains a free end. Thus, the forward movable blade 21 can pivot about the pivot shaft 31a of the forward hinge 31. Similarly, an end (e.g. an upper end) of the rearward movable blade 22 is pivotally supported by the rearward hinge 32 while the other end (e.g. a lower end) of the rearward movable blade 22 remains a free end. Thus, the rearward movable blade 22 can pivot about the pivot shaft 32a of the rearward hinge 32. So as not to cause mutual interference between the forward movable blade 21 and the rearward movable blade 22 in the cooling duct 10, the dimensions and shapes of the forward movable blade 21 and the rearward movable blade 22, the relative positions of the forward hinge 31 and the rearward hinge 32, and the like are adjusted.

While the forward movable blade 21 and the rearward movable blade 22 can pivot freely in the cooling duct 10, the forward stoppers 41 and 42 and the upper stoppers 51 and 52 are provided as restraining members that can restrain the forward movable blade 21 and the rearward movable blade 22 from pivoting to the outside of the cooling duct 10. Accordingly, the pivot ranges of the forward movable blade 21 and the rearward movable blade 22 are restricted within the cooling duct 10.

The forward stoppers 41 and 42 are stoppers used to restrict the forward movable blade 21 and the rearward movable blade 22, respectively, so that the forward movable blade 21 and the rearward movable blade 22 are not allowed to pivot excessively toward the forward side in the longitudinal direction X. The upper stoppers 51 and 52 are stoppers used to restrict the forward movable blade 21 and the rearward movable blade 22, respectively, so that the forward movable blade 21 and the rearward movable blade 22 are not allowed to pivot excessively toward the upper side in the upright direction Z. The forward stoppers 41 and 42 and the upper stoppers 51 and 52 enable the pivot ranges of the forward movable blade 21 and the rearward movable blade 22 to be restricted within ranges between first positions 21A and 22A, where the front opening 15 is closable, and second positions 21B and 22B, where the upper opening 16 is closable.

The pivot range of the forward movable blade 21 is restricted by the forward stopper 41 and the upper stopper 51. In the front face of the duct body 11, for example, the forward stopper 41 is disposed at a lower end of the front opening 15 and in a position where interference with the lower end of the forward movable blade 21 pivoting can occur. The position of the forward movable blade 21 in a case where the forward movable blade 21 abuts on the forward stopper 41 is the first position 21A (see FIG. 3) where the forward movable blade 21 can close the front opening 15. By employing the forward stopper 41, the forward movable blade 21 can be restricted from pivoting further forward than the first position 21A, and the forward movable blade 21 can be prevented from pivoting further forward than the front opening 15 of the duct body 11.

In the upper face of the duct body 11, for example, the upper stopper 51 is disposed further forward than the rearward hinge 32 and in a position where interference with the lower end of the pivoting forward movable blade 21 can occur. The position of the forward movable blade 21 in a case where the forward movable blade 21 abuts on the upper stopper 51 is the second position 21B (see FIG. 3) where the forward movable blade 21 can close the upper opening 16. By employing the upper stopper 51, the forward movable blade 21 can be restricted from pivoting further upward than the second position 21B, and the forward movable blade 21 can be prevented from pivoting further upward than the upper opening 16 of the duct body 11.

The pivot range of the rearward movable blade 22 is restricted by the forward stopper 42 and the upper stopper 52. In a vicinity of a central portion of the duct body 11 in the longitudinal direction X, for example, the forward stopper 42 is disposed on the lower side and in a position where interference with the lower end of the pivoting rearward movable blade 22 can occur. The position of the rearward movable blade 22 in a case where the rearward movable blade 22 abuts on the forward stopper 42 is the first position 22A (see FIG. 3) where the maximum pivoting is allowed. The first position 22A causes no interference between the rearward movable blade 22 and the forward movable blade 21.

In the upper face of the duct body 11, for example, the upper stopper 52 is disposed at a rear end of the upper opening 16 and in a position where interference with the lower end of the pivoting rearward movable blade 22 can occur. The position of the rearward movable blade 22 in a case where the rearward movable blade 22 abuts on the upper stopper 52 is the second position 22B (see FIG. 3) where the rearward movable blade 22 can close the upper opening 16. By employing the upper stopper 52, the rearward movable blade 22 can be restricted from pivoting further upward than the second position 22B while the rearward movable blade 22 can be prevented from pivoting further upward than the upper opening 16 of the duct body 11.

The duct body 11, the movable blades 21 and 22, the hinges 31 and 32, the stoppers 41, 42, 51, and 52 described above make up a louver mechanism of the cooling duct 10. As illustrated in FIG. 3, this louver mechanism allows the movable blades 21 and 22 to swing freely about the pivot shafts 31a and 32a of the hinges 31 and 32 in the internal space of the duct body 11. The forward movable blade 21 and the rearward movable blade 22 can each swing independently and be stopped from pivoting by the stoppers 41 and 51 and the stoppers 42 and 52. Accordingly, the pivot ranges are restricted between the first positions 21A and 22A and the second positions 21B and 22B.

During a flight of the helicopter 1, air flow enters the cooling duct 10 from the outside of the cooling duct 10 through the front opening 15 and the upper opening 16. Depending on the direction in which this air flow comes and its magnitude, the movable blades 21 and 22 swing freely within the ranges between the first positions 21A and 22A and the second positions 21B and 22B described above.

Thus, in the cooling duct 10 according to the present embodiment, the force of air flow from the outside, which is accompanied by the flight of the helicopter 1, enables the movable blades 21 and 22 to swing freely without use of an extra power source, such as an actuator. At this time, while the direction in which air flow comes and its magnitude vary according to the flight state of the helicopter 1, the movable blades 21 and 22 pivot to suitable positions, depending on the direction in which the air flow comes and its magnitude, to guide the air flow to the radiator 6.

For example, when the forward movable blade 21 is positioned in the first position 21A where the front opening 15 is closable, the upper opening 16 is opened to guide air flow into the cooling duct 10 from the upper opening 16 while leakage of the air from the front opening 15 to the outside can be inhibited. When the movable blades 21 and 22 are positioned in the second positions 21B and 22B where the upper opening 16 is closable, the front opening 15 is opened to guide air flow into the cooling duct 10 from the front opening 15 while leakage of the air from the upper opening 16 to the outside can be inhibited.

Thus, in the cooling duct 10 according to the present embodiment, the air flow that enters the duct body 11 from the outside, depending on the flight state of the helicopter 1, causes the movable blades 21 and 22 to swing freely and move automatically to the first positions 21A and 22A, the second positions 21B and 22B, or intermediate positions between the first positions 21A and 22A and the second positions 21B and 22B. As described above, the movable blades 21 and 22 have a feature that the movable blades 21 and 22 serve as shield plates that can close the openings 15 and 16 by swinging freely according to air flow from the outside, which depends on the flight state, while also serving as guide plates that can guide air flow to the radiator 6 in the cooling duct 10. This feature is described in detail below.

3. Operation of Cooling Duct Dependent on Flight State

Next, operation of the cooling duct 10 is described with reference to FIGS. 4 to 6, which depends on the flight state of the helicopter 1 related to the present embodiment.

Described below are examples, as the flight state of the helicopter 1, of (1) a hovering state (where the advance speed is e.g. approximately −0.5 m/s (recession) to 8.0 m/s), (2) a low-speed advancing state (where the advance speed is e.g. approximately 8.0 to 50.0 m/s), and (3) a high-speed advancing state (where the advance speed is e.g. approximately 50.0 to 80.0 m/s). Although the boundary value of the speed between the low-speed advance and the high-speed advance of the helicopter 1 related to the present embodiment is approximately 50.0 m/s, the boundary value may be changed so as to be suitable for the model of the helicopter, and the like. In stopping the operation of the helicopter 1, the forward movable blade 21 and the rearward movable blade 22 are disposed in or near the first positions 21A and 22A under their own weights.

(1) In Hovering State

Figure 4:
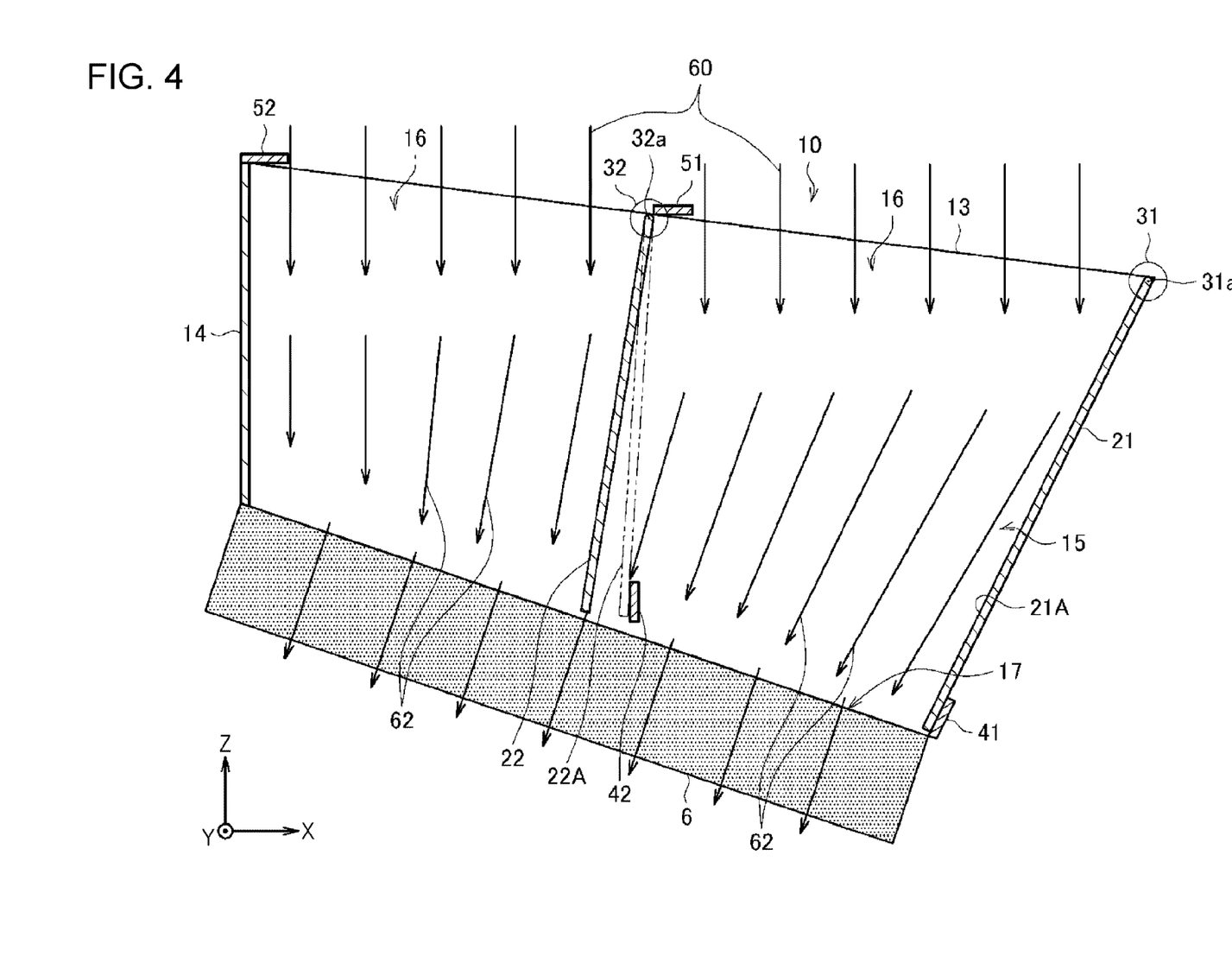
FIG. 4 is a longitudinal cross-sectional view illustrating the cooling duct and air flow in a hovering state of the helicopter related to the embodiment.

FIG. 4 is a longitudinal cross-sectional view illustrating the cooling duct 10 and air flow in a hovering state of the helicopter 1 related to the present embodiment.

As illustrated in FIG. 4, in the hovering state of the helicopter 1, air flow 60 (also referred to as "down wash") that moves downward from the main rotor 2 rotating enters the cooling duct 10 from the upper opening 16 of the cooling duct 10 approximately in the upright direction Z. With the entrance of the air flow 60, the forward movable blade 21 pivots to the first position 21A where the front opening 15 is closable and abuts on the forward stopper 41 to be fixed by the wind pressure of air flow 62 and the forward stopper 41. The rearward movable blade 22 is caused to pivot closer to the first position 22A by the air flow 60 and its blade surface becomes approximately parallel to the upright direction Z. At this time, the rearward movable blade 22 may be caused to abut on the forward stopper 42 by the wind pressure of the air flow 62 or may be swung more or less by the wind pressure of the air flow 62 without being fixed near the first position 22A.

As a result of disposing the forward movable blade 21 and the rearward movable blade 22 as described above, the upper opening 16 of the cooling duct 10 can be opened and the front opening 15 can be closed by the forward movable blade 21. Thus, the air flow 60 from the main rotor 2 enters the cooling duct 10 from the upper opening 16. Consequently, the air flow 62 that moves approximately downward in the cooling duct 10 is formed and the air flow 62 is introduced to the radiator 6 to pass inside the radiator 6.

At this time, the front opening 15 is closed by the forward movable blade 21. Thus, forward leakage of the air flow 62 from the front opening 15 can be inhibited and the air flow 62 can be guided to the radiator 6 efficiently. In addition, the rearward movable blade 22 is positioned so as to be approximately parallel to the air flow 62 while swinging. Thus, the rearward movable blade 22 makes it difficult to hinder the movement of the air flow 62 and the air flow 62 can be guided to the radiator 6 more efficiently.

As described above, in the hovering state, the movable blades 21 and 22 in the louver mechanism of the cooling duct 10 are pressed by the air flows 60 and 62 to pivot closer to the first positions 21A and 22A. Consequently, the cooling duct 10 has a duct shape in which only the upper face (the upper opening 16) is opened while the front face (the forward movable blade 21 that can close the front opening 15), the rear face (the rear face wall 14), and both the side faces (the right side wall 12 and the left side wall 13) are closed. Accordingly, the air flow 60 downward from the main rotor 2 can be supplied to the radiator 6 efficiently and the radiator 6 can be cooled effectively.

(2) In Low-Speed Advancing State

Figure 5:
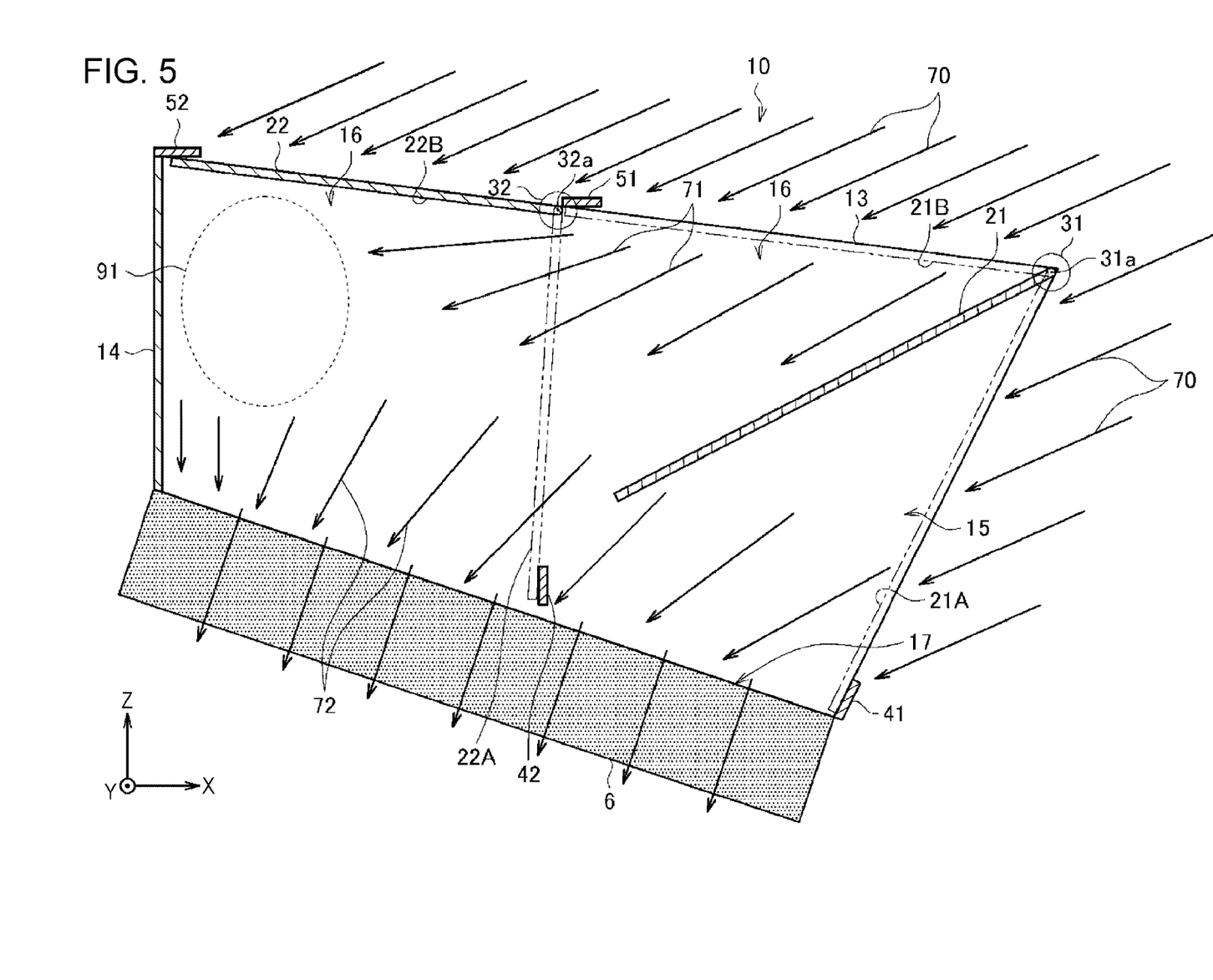
FIG. 5 is a longitudinal cross-sectional view illustrating the cooling duct and air flow in a low-speed advancing state of the helicopter related to the embodiment.

FIG. 5 is a longitudinal cross-sectional view illustrating the cooling duct 10 and air flow in a low-speed advancing state of the helicopter 1 related to the present embodiment.

As illustrated in FIG. 5, in the low-speed advancing state of the helicopter 1, the air flow (down wash) that moves downward from the main rotor 2 and the air flow that comes from the forward side of the helicopter body, accompanied by the advance of the helicopter 1, merge and air flow 70 that comes from the obliquely upper side enters the cooling duct 10 in an oblique direction from the front opening 15 and a forward half of the upper opening 16 of the cooling duct 10.

With the entrance of the air flow 70, the forward movable blade 21 is caused to pivot closer to an intermediate position between the first position 21A and the second position 21B by the air flow 70 while swinging more or less, and its blade surface becomes approximately parallel to the moving direction of the air flow 70. The rearward movable blade 22 pivots to the second position 22B, where the upper opening 16 is closable, and abuts on the upper stopper 52. The rearward movable blade 22 is fixed in the second position 22B by the pressure of a high pressure portion 91, which can be formed near the upper end of the rear face wall 14 of the cooling duct 10 and the upper stopper 52.

As a result of disposing the forward movable blade 21 and the rearward movable blade 22 as described above, the front opening 15 and the forward half of the upper opening 16 of the cooling duct 10 can be opened and the rearward half of the upper opening 16 can be closed by the forward movable blade 22. Thus, the air flow 70 from the obliquely upper side enters the cooling duct 10 from the forward half of the upper opening 16 and the front opening 15. Consequently, air flow 71, which moves obliquely downward in an upper area in the cooling duct 10, and air flow 72, which moves to the radiator 6 in a lower area in the cooling duct 10, are formed. The air flow 72 is introduced to the radiator 6 to pass inside the radiator 6.

At this time, the rearward half of the upper opening 16 is closed by the rearward movable blade 22. Thus, upward leakage of the air flow 71 from the rearward half of the upper opening 16 can be inhibited and the air flows 71 and 72 can be guided to the radiator 6 efficiently. Further, the high pressure portion 91 is formed as a drift in an area between the rearward movable blade 22 and the rear face wall 14. Accordingly, the rearward movable blade 22 is pressed upward and fixed in the second position 22B by the pressure of the high pressure portion 91 and the state where the rearward half of the upper opening 16 is closed can be maintained. In addition, the forward movable blade 21 is positioned so as to be approximately parallel to the air flow 71 while swinging. Thus, the forward movable blade 21 makes it difficult to hinder the movement of the air flow 71 and the air flows 71 and 72 can be guided to the radiator 6 more efficiently.

As described above, in a low-speed advancing state, the movable blades 21 and 22 of the louver mechanism of the cooling duct 10 are pressed by the air flow 60 that moves downward from the main rotor 2 (see FIG. 4) and the air flow 70 from the obliquely upper side, which has merged with the air flow coming from the forward side and accompanied by advance to be pressed in a direction where air pressure is higher. Consequently, the cooling duct 10 has a duct shape in which the forward half of the upper face (the upper opening 16) and the front face (the front opening 15) are opened while the rearward half of the upper face (the rearward movable blade 22 that can close the rearward half of the upper opening 16), the rear face (the rear face wall 14), and both the side faces (the right side wall 12 and the left side wall 13) are closed. Accordingly, the air flow 70 from the obliquely upper side can be taken into the cooling duct 10 and supplied to the radiator 6 efficiently, and the radiator 6 can be cooled effectively. Even in a low-speed advancing state in FIG. 5, a similar extent of the air flow to that in the hovering state in FIG. 4 can be delivered into the radiator 6.

(3) In High-Speed Advancing State

Figure 6:
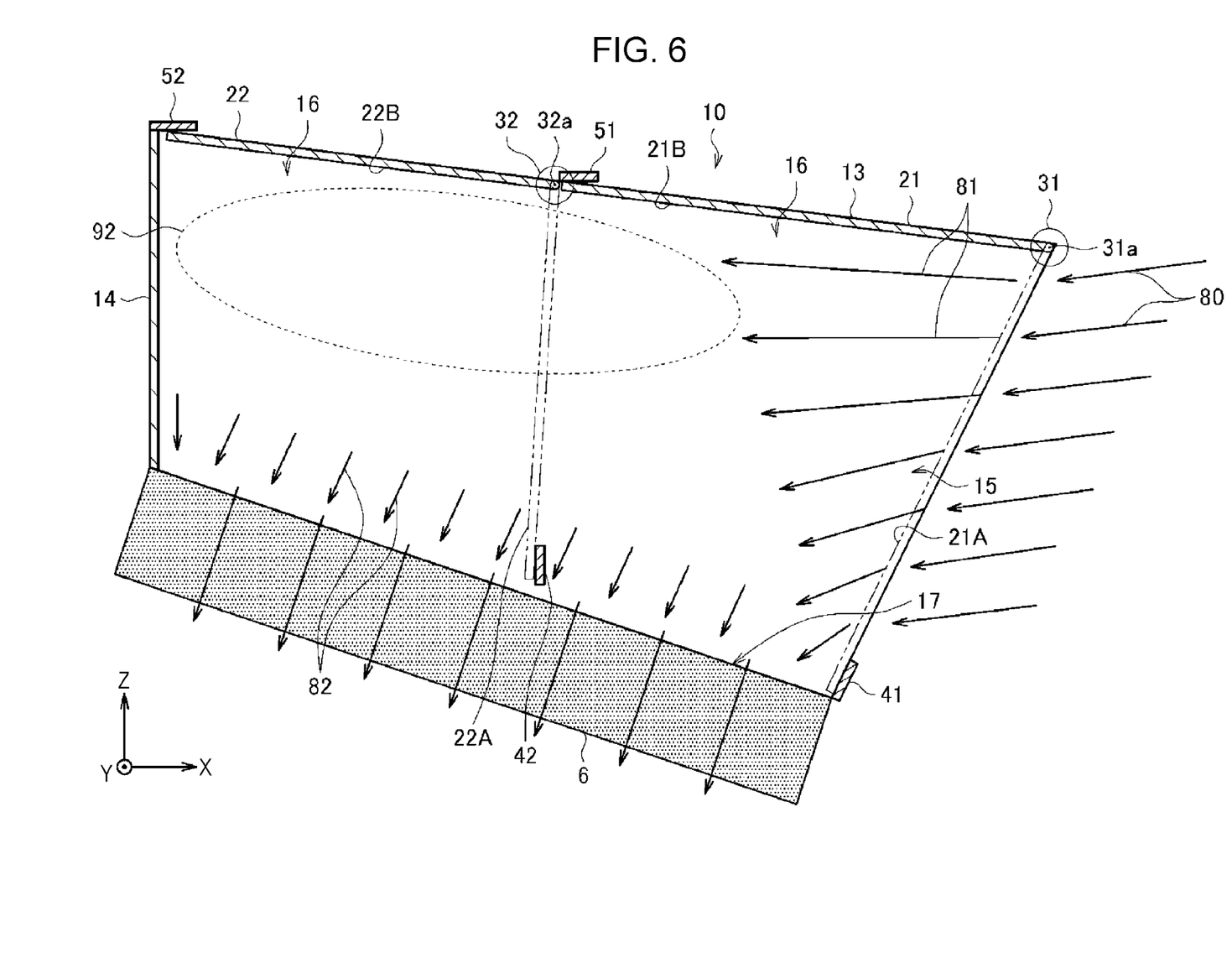
FIG. 6 is a longitudinal cross-sectional view illustrating the cooling duct and air flow in a high-speed advancing state of the helicopter related to the embodiment.

FIG. 6 is a longitudinal cross-sectional view illustrating the cooling duct 10 and air flow in a high-speed advancing state of the helicopter 1 related to the present embodiment.

As illustrated in FIG. 6, in a high-speed advancing state of the helicopter 1, air flow (down wash) that moves downward from the main rotor 2 is moved rearward and air flow 80 from the forward side of helicopter body, which the high-speed advance of the helicopter 1 accompanies, becomes predominant. Thus, the air flow 80 (front wind) from the forward side that is strong enters the cooling duct 10 from the front opening 15 of the cooling duct 10.

By the entrance of the strong air flow 80, both the forward movable blade 21 and the rearward movable blade 22 are caused to pivot to the second positions 21B and 22B where the upper opening 16 is closed and abut on the upper stoppers 51 and 52. After that, the forward movable blade 21 and the rearward movable blade 22 are fixed in the second positions 21B and 22B by the pressure of a high pressure portion 92, which is formed from the rearward side to an approximately central portion in an upper area in the cooling duct 10, and the upper stoppers 51 and 52.

As a result of disposing the forward movable blade 21 and the rearward movable blade 22 as described above, the front opening 15 of the cooling duct 10 can be fully opened and the upper opening 16 can be entirely closed by the forward movable blade 21 and the rearward movable blade 22. Thus, the air flow 80 from the forward side enters the cooling duct 10 from the front opening 15. Consequently, air flow 81, which moves approximately rearward in a forward area in the cooling duct 10, and air flow 82, which moves toward the radiator 6 in a lower area in the cooling duct 10, are formed. The air flow 82 is introduced to the radiator 6 to pass inside the radiator 6.

At this time, the upper opening 16 is closed by the forward movable blade 21 and the rearward movable blade 22. Thus, leakage of the air flow 81 upward from the upper opening 16 can be inhibited and the air flows 81 and 82 can be guided to the radiator 6 efficiently. Further, the high pressure portion 92 is formed as a drift in an upper area in the cooling duct 10. Accordingly, the forward movable blade 21 and the rearward movable blade 22 are pressed and fixed in the second positions 21B and 22B by the pressure of the high pressure portion 92 and the state where the upper opening 16 is closed can be maintained.

As described above, in the high-speed advancing state, the movable blades 21 and 22 in the louver mechanism of the cooling duct 10 are pressed by the air flows 80 and 81 from the forward side to pivot to the second positions 21B and 22B. Consequently, the cooling duct 10 has a duct shape in which only the front face (the front opening 15) is opened while the upper face (the forward movable blade 21 and the rearward movable blade 22 that can close the upper opening 16), the rear face (the rear face wall 14), and both the side faces (the right side wall 12 and the left side wall 13) are closed. Accordingly, the air flow 80 (front wind) from the forward side can be taken into the cooling duct 10 and supplied to the radiator 6 efficiently, and the radiator 6 can be cooled effectively. In the high-speed advancing state in FIG. 6, a larger extent of the air flow than that in the hovering state in FIG. 4 can be delivered into the radiator 6.

4. Outline

As described above, in the louver mechanism of the cooling duct 10 according to the present embodiment, the walls 12, 13, and 14, which can interrupt air, cover both the right and left side faces, and the rear face of the duct body 11 on the basis of the body of the helicopter 1 while the movable blades 21 and 22, which can swing easily with air flow, are provided axially using the hinges 31 and 32 so as to be pivotable, and the plurality of stoppers 41, 42, 51, and 52, which can limit the pivot angles of the movable blades 21 and 22, are provided.

With this louver mechanism, as illustrated in FIGS. 4 to 6, the air flows 60, 70, and 80 dependent on the flight state of the helicopter 1 cause the movable blades 21 and 22 to pivot automatically to suitable pivot angles. Thus, the cooling duct 10 has a suitable louver shape according to the flight state. As a result, air flow used to cool the radiator 6 can be introduced efficiently to the radiator 6. Accordingly, air flow used to cool the radiator 6 can be automatically supplied in the hovering state, the low-speed advancing state, and the high-speed advancing state of the helicopter 1 and, regardless of the flight state, the cooling effect of the radiator 6 can be ensured. As a result, the degree of flexibility in the placement positions of the air-cooling mechanisms, such as the radiator 6, the cooling duct 10, and the like, in a forward portion of the body of the helicopter 1 can be raised.

Further, in the cooling duct 10 according to the present embodiment, it is unnecessary to provide a driving device used to pivot the movable blades 21 and 22, such as an actuator, its controller, or a sensor. Accordingly, the weight and the number of components of the air-cooling mechanism for the radiator 6 can be reduced while the air-cooling mechanism can be simplified and decreased in weight. As a result, the weight, manufacturing costs, and running costs of the helicopter 1 can be reduced.

Further, in the cooling duct 10 according to the present embodiment, a plurality of movable blades, i.e. the movable blades 21 and 22, are provided in parallel in the longitudinal direction X. Thus, depending on the flight state of the helicopter 1, the plurality of movable blades 21 and 22 pivot separately and independently to be positioned suitably. Accordingly, air flow can be supplied to the radiator 6 more efficiently, compared with a case where the number of movable blades is one.

Moreover, in an advancing state of the helicopter 1, depending on the advance speed, the strengths of the air flows 70 and 80 that move from the forward side to the rearward side of the helicopter body vary. In the present embodiment, as illustrated in FIGS. 5 and 6, depending on the strengths of the air flows 70 and 80 that move from the forward side to the rearward side of the helicopter body, the forward movable blade 21 pivots to an intermediate position between the first position 21A and the second position 21B, or to the second position 21B. Thus, also depending on the advance speed of the helicopter 1, the louver mechanism of the cooling duct 10 has a suitable shape, and, regardless of the advance speed, desired air flow can be introduced to the radiator 6 efficiently.

5. Other Embodiments

Next, cooling ducts 10 according to other embodiments of the disclosure are described. Although in the above-described first embodiment, two movable blades, i.e. the movable blades 21 and 22, of the louver mechanism of the cooling duct 10 are provided, the number of movable blades or the size of each movable blade in the disclosure are not limited to this example. For example, as illustrated in FIG. 7, one movable blade, i.e. a movable blade 24, may be provided or, as illustrated in FIG. 8, three or more movable blades, i.e. movable blades 21, 22, and 23, may be provided.

The cooling duct 10 according to a second embodiment is described with reference to FIG. 7. FIG. 7 is a longitudinal cross-sectional view illustrating the cooling duct 10 and air flow in a low-speed advancing state of a helicopter 1 related to the second embodiment.

Figure 7:
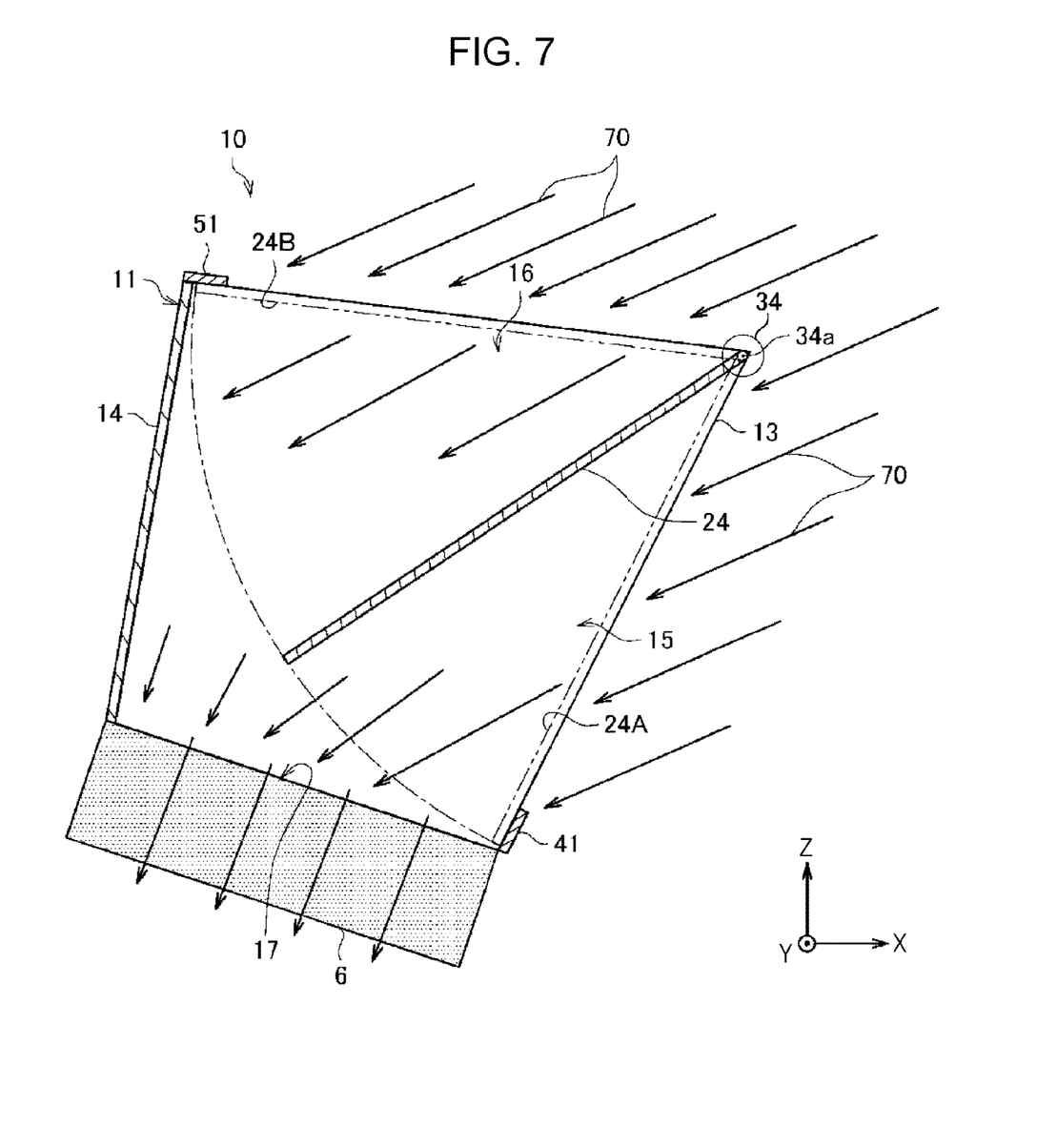
FIG. 7 is a longitudinal cross-sectional view illustrating a cooling duct and air flow in a low-speed advancing state of a helicopter related to a second embodiment of the disclosure.
Figure 8:
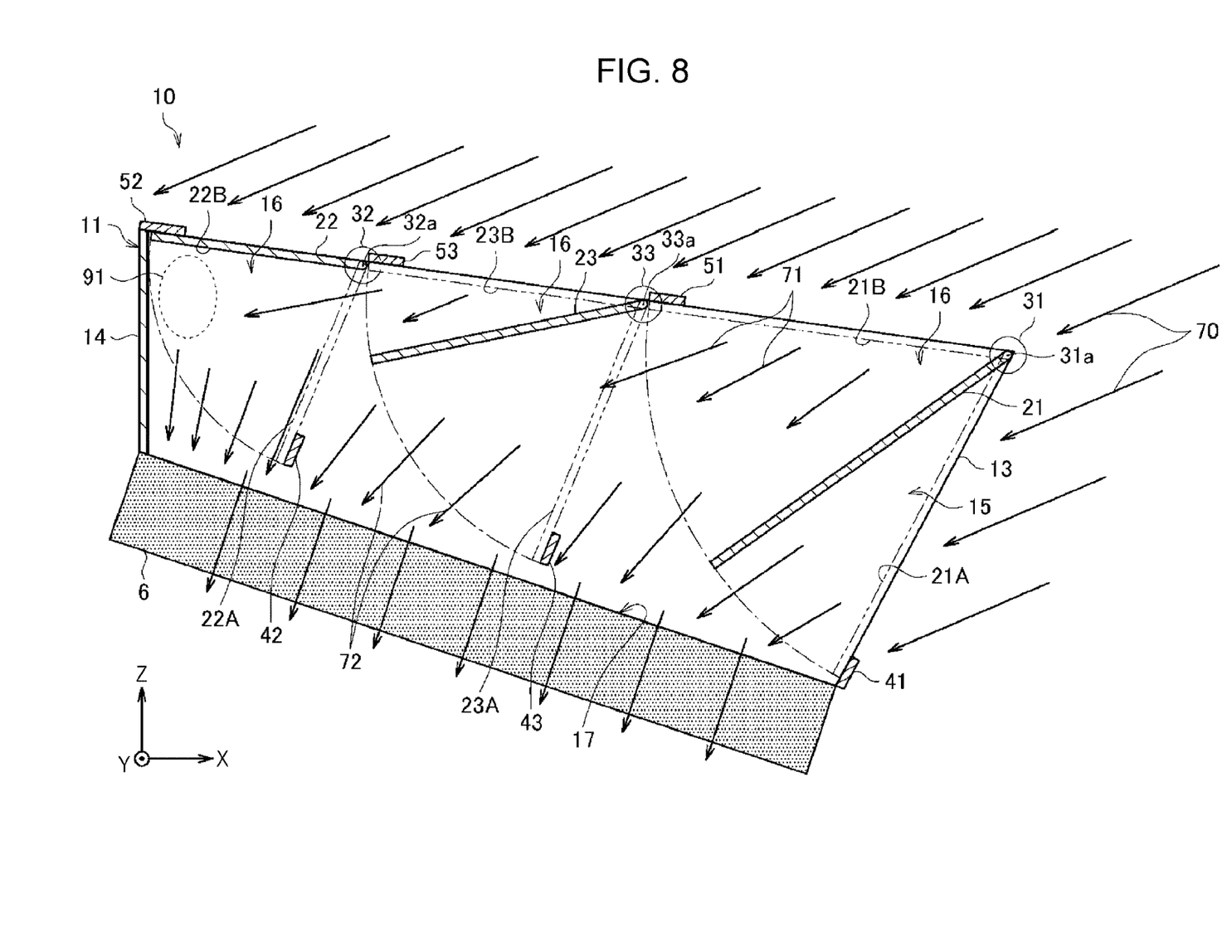
FIG. 8 is a longitudinal cross-sectional view illustrating a cooling duct and air flow in a low-speed advancing state of a helicopter related to a third embodiment of the disclosure.

As illustrated in FIG. 7, the cooling duct 10 according to the second embodiment includes a single movable blade in the duct body 11, i.e. the movable blade 24, which is made up of a right side wall 12, a left side wall 13, and a rear face wall 14. The movable blade 24 is pivotally supported by a hinge 34 provided near a forward end in an upper portion of the duct body 11 and is pivotable about a pivot shaft 34a. A front opening 15 and an upper opening 16 of the duct body 11 are each adjusted so as to have an opening area approximately the same as the area of the movable blade 24. A forward stopper 41 is provided in a lower portion of the front opening 15 while an upper stopper 51 is provided in a rear portion of the upper opening 16. The movable blade 24 is pivotable between a first position 24A where the front opening 15 is closable and a second position 24B where the upper opening 16 is closable.

The movable blade 24 is swung freely according to the flight state of the helicopter 1 between the first position 24A and the second position 24B mentioned above by air flow from the outside to be positioned suitably and guide the air flow to a radiator 6. For example, in a hovering state, the movable blade 24 is in the first position 24A and closes the front opening 15. Accordingly, air flow from the upper side can be introduced to the radiator 6 efficiently. In a low-speed advancing state, as illustrated in FIG. 7, the movable blade 24 is in an intermediate position between the first position 24A and the second position 24B so as to be approximately parallel to air flow 70 from the obliquely upper side. Accordingly, the air flow 70 from the obliquely upper side can be introduced to the radiator 6 efficiently. In a high-speed advancing state, the movable blade 24 is in the second position 24B and closes the upper opening 16. Accordingly, air flow from the forward side can be introduced to the radiator 6 efficiently.

A structure of the cooling duct 10 according to the second embodiment is described above. With this structure, similar to the above-described first embodiment, air flow dependent on the flight state of the helicopter 1 causes the single movable blade 24 to pivot automatically to a suitable pivot angle. Accordingly, depending on the flight state, air flow from the outside can be introduced to the radiator 6 efficiently and the cooling effect on the radiator 6 can be ensured.

If the upper area of the radiator 6 is small, the cooling duct 10 according to the second embodiment is effective since the cooling duct 10, which is relatively small, and the single movable blade 24 can work sufficiently. If the upper area of the radiator 6 is large, the cooling duct 10 that simply includes the single movable blade 24 can be tall in the upright direction Z and the cooling duct 10 can interference with the main rotor 2. Thus, if the upper area of the radiator 6 is larger than a predetermined area, it is desirable to employ the cooling duct 10 that includes the plurality of movable blades 21 and 22 as in the above-described first embodiment. Consequently, increase in the height of the cooling duct 10 in the upright direction Z can be hindered and the degree of flexibility in the placement position of the cooling duct 10 and space can be raised.

Next, a cooling duct 10 according to a third embodiment is described with reference to FIG. 8. FIG. 8 is a longitudinal cross-sectional view illustrating the cooling duct 10 and air flow in a low-speed advancing state of a helicopter 1 related to the third embodiment.

As illustrated in FIG. 8, the cooling duct 10 according to the third embodiment includes a louver mechanism including three movable blades, i.e. movable blades 21, 22, and 23. For example, compared with the cooling duct 10 according to the above-described first embodiment, the cooling duct 10 according to the third embodiment additionally includes an intermediate movable blade 23, an intermediate hinge 33, a forward stopper 43, and an upper stopper 53.

The intermediate movable blade 23 is disposed between the forward movable blade 21 and the rearward movable blade 22 mentioned above and is pivotally supported by the intermediate hinge 33 and provided so as to be pivotable about a pivot shaft 33a of the intermediate hinge 33. Further, the forward stopper 43 and the upper stopper 53 are provided so that the pivot range of the intermediate movable blade 23 can be restricted between a first position 23A and a second position 23B.

Thus, also in the cooling duct 10 according to the third embodiment, similar to the above-described first embodiment, air flow dependent on the flight state of the helicopter 1 causes the three movable blades 21, 22, and 23 to automatically pivot separately and independently to suitable pivot angles. Accordingly, depending on the flight state, air flow from the outside can be introduced to a radiator 6 efficiently and the cooling effect on the radiator 6 can be ensured.

Further, in the third embodiment, as illustrated in FIG. 8, in a low-speed advancing state, the pivot angles of the forward movable blade 21, the intermediate movable blade 23, and the rearward movable blade 22 can be automatically adjusted to suitable angles separately and independently according to the entrance direction and strength of air flow 70. Accordingly, the movements of air flows 71 and 72 in the cooling duct 10 can be guided more efficiently than those in the first embodiment, and be introduced to the radiator 6 efficiently.

Even if the radiator 6 is long in the longitudinal direction X and has a large upper area, the use of the cooling duct 10 with the three movable blades 21, 22, and 23 according to the third embodiment is advantageous since the height of the cooling duct 10 in the upright direction Z can be restricted.

Although some embodiments of the disclosure are described above with reference to the accompanying drawings, the disclosure is not limited to these embodiments. It is possible for a person skilled in the art to conceive many kinds of variations and modifications within the scope recited in the aspects of the disclosure. Such variations and modifications are also understood as belonging to the technical scope of the present disclosure.

For example, in the above-described embodiments, as illustrated in FIGS. 2 and 3, the radiator 6 is disposed on the lower face side of the cooling duct 10 and the walls 12, 13, and 14 are provided for both of the side faces and the rear face of the cooling duct 10 while the lower opening 17 is provided for the lower face. The disclosure is, however, not limited to this example. For another example, a cooling target device, such as a radiator or an oil cooler, may be disposed on the rear face of the cooling duct. In this case, walls may be provided for both of the side faces and the lower face of the cooling duct and a rear opening may be provided for the rear face so that air in the cooling duct can flow to the cooling target device on the rear face side.

For example, according to the above-described embodiments, the movable blades 21, 22, and 23 can pivot freely about the pivot shafts 31a, 32a, and 33a of the hinges 31, 32, and 33. However, for another example, the pivoting of the movable blades may be restricted to some extent using a damper that can interference with the movable blade, by friction, or the like. Accordingly, excessive swinging of the movable blades can be restricted and the movable blades can be prevented from getting damaged.

The invention claimed is:

1. A cooling duct configured to introduce air flow to a cooling target device provided in a helicopter body of a helicopter, the cooling duct comprising:
    a duct body mountable below a main rotor of the helicopter so as to be adjacent to the cooling target device;
    a front opening formed on a forward side of the helicopter body in the duct body;
    an upper opening formed on an upper side of the helicopter body in the duct body;
    a hinge disposed in an upper portion of the duct body and comprising a pivot shaft extending in a lateral direction of the helicopter body; and
    a movable blade with an end that is pivotally supported by the hinge, the movable blade being provided so as to be pivotable about the pivot shaft between a first position where the front opening is closable and a second position where the upper opening is closable,
    wherein the duct body is provided over the cooling target device.

2. The cooling duct according to claim 1, wherein the duct body includes:
    a right side wall;
    a left side wall; and
    a rear face wall at an opposite end of the duct body to the front opening, the rear face wall being coupled to the right side wall and the left side wall.

3. The cooling duct according to claim 1, further comprising a lower opening configured as a discharge port used to discharge the air in the duct body to the radiator positioned below the lower opening.

4. The cooling duct according to claim 3, wherein the lower opening and the upper opening are positioned on opposite sides of the front opening, and
    wherein a cross section of the front opening is perpendicular to a cross section of the lower opening and a cross section of the upper opening.

5. The cooling duct according to claim 3, wherein the movable blade is positioned across the upper opening, and
    wherein the airflow is guided from the front opening and the upper opening via the movable blade towards the lower opening that is positioned directly above the radiator.

6. The cooling duct according to claim 1, wherein the movable blade comprises a plurality of movable blades and the plurality of movable blades are provided in parallel in a longitudinal direction of the helicopter body.

7. The cooling duct according to claim 6, wherein the hinge comprises
    a forward hinge disposed on the forward side of the helicopter body in the upper portion of the duct body, and
    a rearward hinge disposed further on a rearward side of the helicopter body in the upper portion of the duct body, and
    the plurality of movable blades comprises
    a forward movable blade pivotally supported by the forward hinge so as to be pivotable, and
    a rearward movable blade pivotally supported by the rearward hinge so as to be pivotable.

8. The cooling duct according to claim 7, wherein
    in the hovering state of the helicopter, the air flow going downward from the main rotor moves the forward movable blade to the first position where the front opening is closable, and
    in the advancing state of the helicopter, the air flow going rearward from the forward side of the helicopter body moves at least the rearward movable blade to the second position where the upper opening is closable.

9. The cooling duct according to claim 8, wherein
    in the advancing state of the helicopter,
    depending on strength of the air flow going rearward from the forward side of the helicopter body, the forward movable blade moves to the intermediate position between the first position and the second position or to the second position.

10. The cooling duct according to claim 1, wherein the movable blade is swung about the pivot shaft by air flow that enters the duct body from outside according to a flight state of the helicopter and moves to the first position, the second position, or an intermediate position between the first position and the second position.

11. The cooling duct according to claim 10, wherein the movable blade comprises a plurality of movable blades and the plurality of movable blades are provided in parallel in a longitudinal direction of the helicopter body.

12. The cooling duct according to claim 11, wherein
    the hinge comprises
        a forward hinge disposed on the forward side of the helicopter body in the upper portion of the duct body, and
        a rearward hinge disposed further on a rearward side of the helicopter body in the upper portion of the duct body, and
    the plurality of movable blades comprises
        a forward movable blade pivotally supported by the forward hinge so as to be pivotable, and
        a rearward movable blade pivotally supported by the rearward hinge so as to be pivotable.

13. The cooling duct according to claim 12, wherein
    in the hovering state of the helicopter, the air flow going downward from the main rotor moves the forward movable blade to the first position where the front opening is closable, and
    in the advancing state of the helicopter, the air flow going rearward from the forward side of the helicopter body moves at least the rearward movable blade to the second position where the upper opening is closable.

14. The cooling duct according to claim 13, wherein
    in the advancing state of the helicopter,
    depending on strength of the air flow going rearward from the forward side of the helicopter body, the forward movable blade moves to the intermediate position between the first position and the second position or to the second position.

15. The cooling duct according to claim 10, wherein
    in a hovering state of the helicopter,
    air flow going downward from the main rotor moves the movable blade to the first position where the front opening is closable, and
    in an advancing state of the helicopter,
    air flow going rearward from the forward side of the helicopter body moves the movable blade to the second position where the upper opening is closable.

16. The cooling duct according to claim 15, wherein the movable blade comprises a plurality of movable blades and the plurality of movable blades are provided in parallel in a longitudinal direction of the helicopter body.

17. The cooling duct according to claim 16, wherein
the hinge comprises
- a forward hinge disposed on the forward side of the helicopter body in the upper portion of the duct body, and
- a rearward hinge disposed further on a rearward side of the helicopter body in the upper portion of the duct body, and the plurality of movable blades comprises
- a forward movable blade pivotally supported by the forward hinge so as to be pivotable, and
- a rearward movable blade pivotally supported by the rearward hinge so as to be pivotable.

18. The cooling duct according to claim 17, wherein
in the hovering state of the helicopter, the air flow going downward from the main rotor moves the forward movable blade to the first position where the front opening is closable, and
in the advancing state of the helicopter, the air flow going rearward from the forward side of the helicopter body moves at least the rearward movable blade to the second position where the upper opening is closable.

19. The cooling duct according to claim 18, wherein
in the advancing state of the helicopter,
depending on strength of the air flow going rearward from the forward side of the helicopter body, the forward movable blade moves to the intermediate position between the first position and the second position or to the second position.

\* \* \* \* \*